(No Model.)
2 Sheets—Sheet 1.
M. G. BUNNELL.
MACHINE FOR MAKING AND REPAIRING ROADS.
No. 510,955. Patented Dec. 19, 1893.
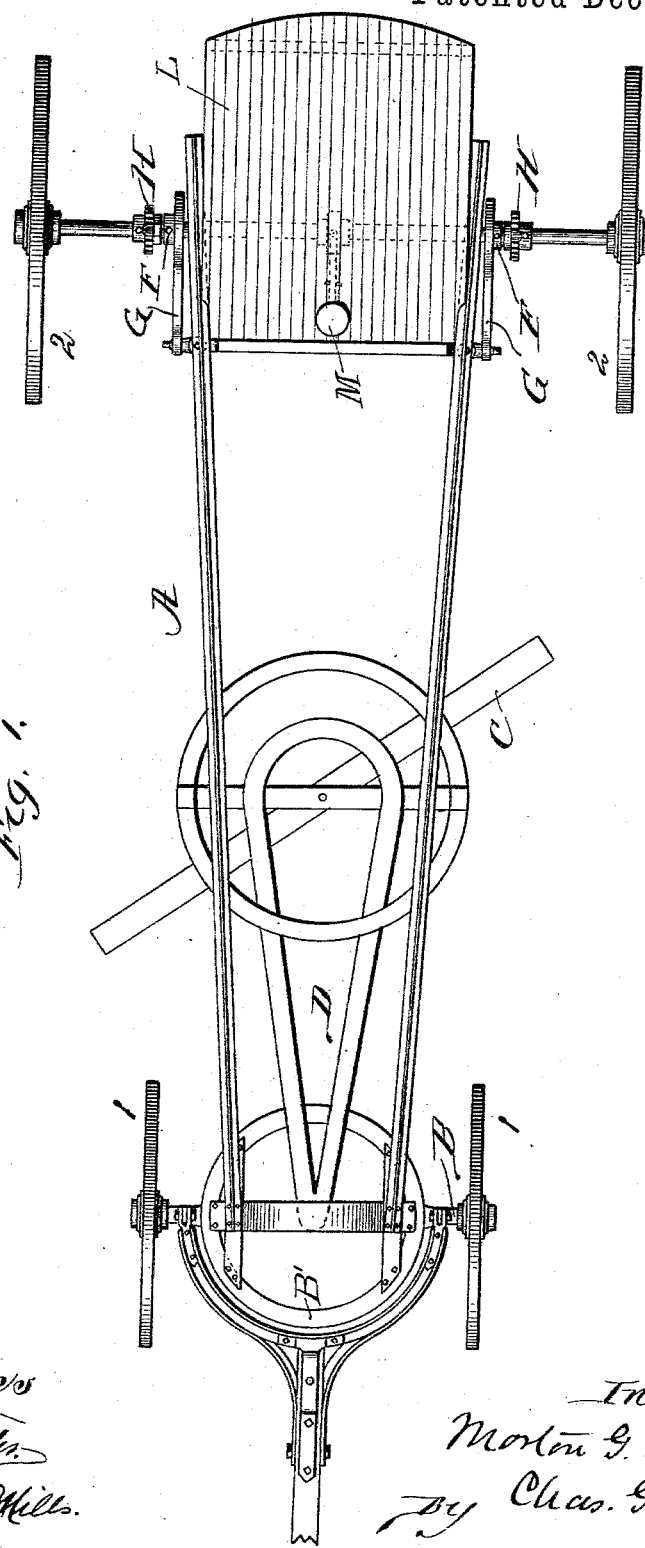

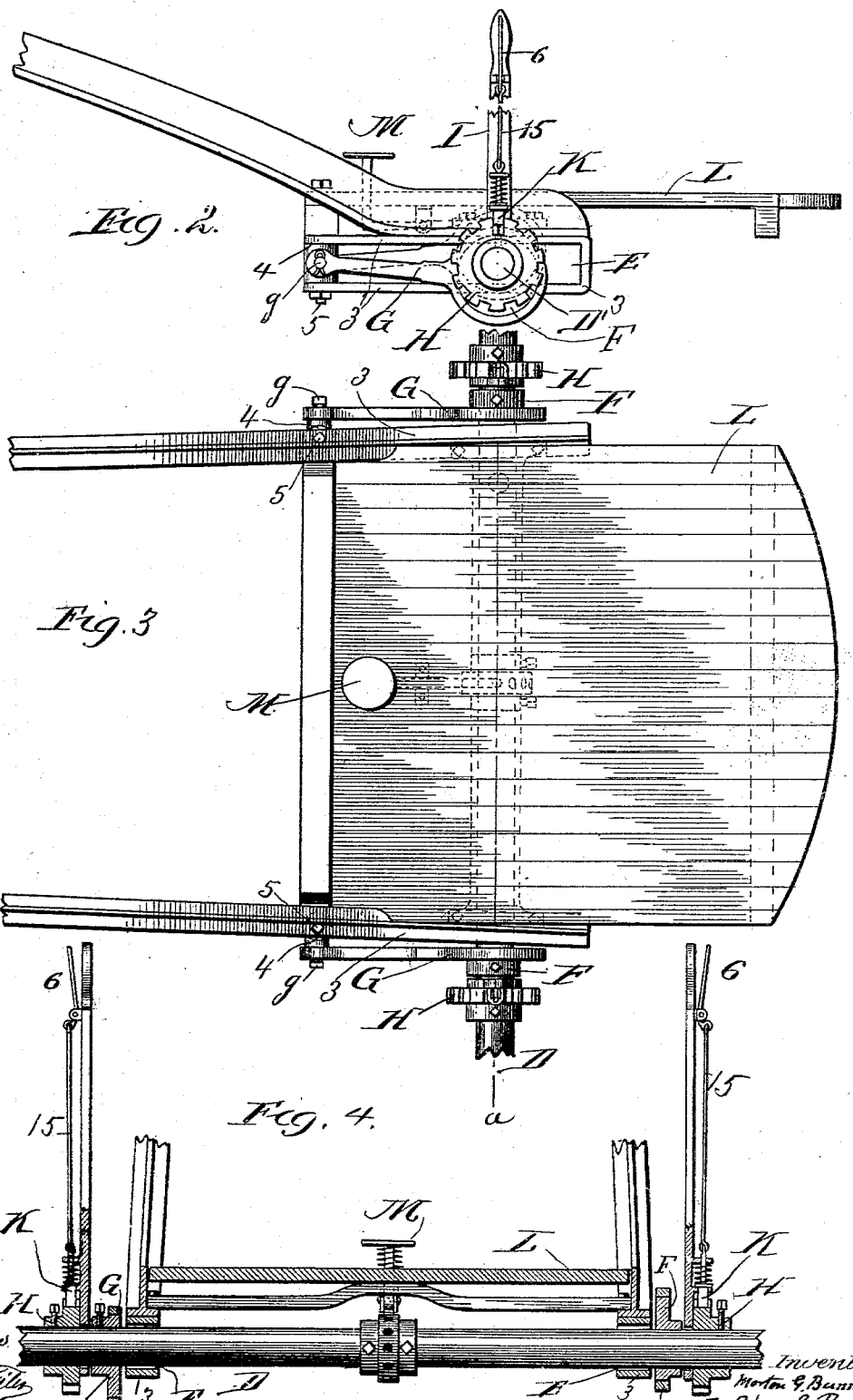

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 510,955, dated December 19, 1893.

Application filed February 28, 1891. Serial No. 383,140. (No model.)

*To all whom it may concern:*

Be it known that I, MORTON G. BUNNELL, a citizen of the United States, residing at Chicago, in the county of Cook and State of Illinois, have invented certain new and useful Improvements in Machines for Making and Repairing Roads, of which the following is a specification.

My invention relates to a construction of road-working machines adapted for making and repairing roads and involving a diagonally-adjustable scraper-blade arranged to extend across the space between the front and rear wheels, and a rear axle having a horizontally swinging adjustment;—for the purposes of effecting certain changes in the position of the rear wheels relatively to the front wheels; positioning the rear wheels with reference to the position and horizontal angular or diagonal adjustment of the scraper-blade; setting the scraper-blade farther toward one side or the other of the machine; overcoming side-draft, and attaining various other serviceable ends in road-working machines.

The object of my invention is to provide novel and improved means for effecting the aforesaid horizontal swinging adjustment of the rear axle.

In the accompanying drawings:—Figure 1 is a top plan of a road-working machine embodying my invention. Fig. 2 is a side elevation of the rear portion of the body-frame and means for adjusting the rear axle. Fig. 3 is a top plan of Fig. 2, the end portions of the rear axle being broken away for convenience of illustration. Fig. 4 is a section on line *a—a* in Fig. 2, the axle being, however, shown in elevation.

The body-frame A is, at its forward end, pivotally supported upon the front axle B; a preferred pivotal connection between the two being a fifth wheel, although any other known or suitable pivotal connection can be employed.

The scraper-blade C is arranged to extend across the space between the front and rear wheels 1 and 2; and is diagonally adjustable. That is to say, it is pivotally held between its ends so that it can be swung horizontally about its longitudinal middle, and hence be set more or less oblique to the line of progress. The scraper blade can be pushed or drawn from the body frame; but is preferably drawn by a horizontally swinging and vertically tilting draft-bar D which is pivotally held at the forward end of the machine.

It is understood that, in practice, means are provided for swinging and tilting the draft bar and for adjusting the scraper-blade independently of the draft bar so as to vary the horizontal angle or diagonal adjustment of the blade relatively to the line of road; and, also, that means are provided for effecting the raising and lowering of the blade. Various devices have been provided for effecting such adjustments on the part of the draftbar and scraper-blade; and hence, the same need not be herein illustrated, it being observed, however, that efficient devices for such purposes have been devised by me, and embodied in Letters Patent of the United States Nos. 427,738 and 427,739.

The rear axle D' is arranged to both rotate on its central longitudinal axis and to swing horizontally on a vertical pivot; and, to such end, it is extended through horizontally-framed guide-ways E respectively at opposite sides of the body-frame. The guide-ways can be formed by any suitably constructed frames or castings; a convenient way being to provide U-shaped bars 3 which are secured to the body-frame and arranged so that the spaces between their horizontally disposed arms provide said guide-ways E.

The rear axle is provided with a pair of cams or eccentrics F respectively secured thereon at opposite sides of the body-frame; and the body-frame carries a couple of swinging straps G respectively engaging one and the other of said eccentrics. The straps G are pivotally held at points forward of the rear axle; and, as a convenient arrangement, are pivoted to blocks 4 arranged at the forward ends of the guide-ways E and secured to the arms of the U-shaped bars 3. The straps G are pivoted so that they can swing vertically, and are also pivoted loosely so that they can have a horizontal swinging play; or, if preferred, the blocks 4 can turn on the bolts 5 by which they are attached to the bent bars E, the bolts in such case serving as vertical pivots. When the rear axle is in its normal position, that is to say, at right angles to the length of the body-frame the eccentrics will be respectively up and down; so that, while one strap will be at the lowest limit of its vertical swing, as at the left in Fig. 4, the other strap will be at the highest limit of its vertical swing, as at the right in said figure. If, now, the rear axle is rotated, so as turn the two eccentrics thereon, it will be compelled to swing horizontally about its longitudinal middle. The vertical swing of each strap permits it to rise and fall according to the position of the highest portion of the eccentric relatively to the axis of the axle. The capability of horizontal swing on the part of the strap is to prevent binding when the axle is swung horizontally. Thus, if for example the high portion of one eccentric is directly forward of one end of the axle, the axis of the latter at such point will necessarily be farther to the rear than it will be when such high portion of the eccentric is in rear of said axis, and in either case, the horizontal swing on the part of the strap will prevent binding between the inner circular side of the strap and the eccentric.

As a matter of course, the axle could be pivotally held at one end in any suitable pivoted bearing for example as in Patent No. 379,679 and swing from the other end by a strap and eccentric; but I prefer duplicating such devices, so that either end of the rear axle can be set ahead.

While various means can be provided for rotating the rear axle, I prefer providing it with ratchets, or notched wheels or disks, which are fixed on the axle, and with vibratory hand levers I loosely supported on said axle and provided with latches K for engaging the ratchets H. The latch-rods 15 are connected with thumb-levers 6 pivoted on the hand levers. An attendant standing on the rear platform L can grasp and operate the hand levers so as to rotate the rear axle either way, and, hence, set the axle at any desired angle relatively to the length of the body-frame.

M designates a spring actuated locking latch adapted to engage with a hub carried by the axle D— and thereby lock the latter against rotation. The upper or head end of this locking latch is arranged so that an attendant standing upon the platform L can operate it with his foot.

I do not in this application claim broadly the combination of a wheel-supported body-frame, a diagonally-adjusted scraper blade arranged between the front and rear wheels, and a horizontally swinging rotarily adjustable rear axle; as I have made such claim in another application of mine, Serial No. 383,392, now pending in the United States Patent Office.

What I claim as my invention is—

1. The combination in a road-working machine of a body-frame, a diagonally adjustable scraper blade, a horizontally swinging rotary rear axle, an eccentric fixed upon said axle, and a strap engaging the eccentric, substantially as set forth.

2. The combination in a road-working machine involving a diagonally adjustable scraper-blade of the horizontally swinging rotary rear axle, eccentrics fixed upon said axle, and swinging straps attached to the body-frame of the machine and engaging the eccentrics, substantially as set forth.

3. The combination in a road-working machine involving a diagonally adjustable scraper-blade, of the horizontally swinging rear axle, eccentrics fixed upon the rear axle, straps attached to the body frame of the machine and engaging the eccentrics, vibratory hand-levers loosely supported on the rear axle, and carrying latches arranged to engage ratchets on the said axle, substantially as set forth.

4. The combination in a road-working machine of the horizontally swinging rotary rear axle provided with cams or eccentrics, straps attached to the body frame and engaging the eccentrics, and a locking device to hold said axle against rotation, substantially as set forth.

5. The combination substantially as hereinbefore set forth in a machine for making and repairing roads, of a body-frame pivotally connected with the front axle, a diagonally adjustable scraper-blade arranged to extend across the space between the front and rear wheels, the horizontally swinging and rotary rear axle extending through guideways on the body-frame, eccentrics fixed upon the rear axle, straps engaging the eccentrics and connected with the body-frame by universal joints, a swinging hand lever loose upon the rear axle, a ratchet, on the axle, and a latch carried by said hand lever and arranged to engage said ratchet.

MORTON G. BUNNELL.

Witnesses:
HARRY COBB KENNEDY,
CHAS. G. PAGE.